United States Patent
Liu

(10) Patent No.: US 11,511,275 B2
(45) Date of Patent: Nov. 29, 2022

(54) FLOW CONTROL IN MICROFLUIDIC ROUTER

(71) Applicant: IMEC VZW, Leuven (BE)

(72) Inventor: Chengxun Liu, Kessel-lo (BE)

(73) Assignee: IMEC VZW, Leuven (BE)

( * ) Notice: Subject to any disclaimer, the term of this patent is extended or adjusted under 35 U.S.C. 154(b) by 158 days.

(21) Appl. No.: 16/959,311

(22) PCT Filed: Dec. 20, 2018

(86) PCT No.: PCT/EP2018/086141
§ 371 (c)(1),
(2) Date: Jun. 30, 2020

(87) PCT Pub. No.: WO2019/129631
PCT Pub. Date: Jul. 4, 2019

(65) Prior Publication Data
US 2020/0353468 A1  Nov. 12, 2020

(30) Foreign Application Priority Data

Dec. 31, 2017  (EP) ..................................... 17211262
Mar. 27, 2018  (EP) ..................................... 18164310

(51) Int. Cl.
*G01N 21/00* (2006.01)
*B01L 3/00* (2006.01)
*G01N 21/01* (2006.01)

(52) U.S. Cl.
CPC ... *B01L 3/502715* (2013.01); *B01L 3/502746* (2013.01); *G01N 21/00* (2013.01);
(Continued)

(58) Field of Classification Search
CPC .... B01L 3/50271; B01L 3/5027; B01L 3/502; B01L 3/502746; B01L 2200/027;
(Continued)

(56) References Cited

U.S. PATENT DOCUMENTS

2013/0260447 A1  10/2013  Link

FOREIGN PATENT DOCUMENTS

WO  2012067985 A2  5/2012
WO  2012142664 A1  10/2012
(Continued)

OTHER PUBLICATIONS

International Search Report and Written Opinion, PCT Application No. PCT/EP2018/086141, dated Feb. 18, 2019, 14 pages.

*Primary Examiner* — Christine T Mui
(74) *Attorney, Agent, or Firm* — McDonnell Boehnen Hulbert & Berghoff LLP

(57) ABSTRACT

A method for detecting, sorting, purifying and characterizing objects of interest in a liquid sample. The method comprises preparing, in a preparation module ON) of a microfluidic router system, the liquid sample for processing. Preparing comprises transporting the sample through a microfluidic channel, and forwarding the prepared sample from an outlet of the preparation module into an inlet of a routing module. Forwarding comprises coupling a microfluidic flow between the outlet and the inlet to passively buffer against or actively compensate for variations in a flow rate of the prepared sample at the outlet, and diverting the objects of interest from the microfluidic flow. Forwarding the sample comprises sensing a flow characteristic of the sample in preparation, routing module, or in flow connection, and controlling a flow control element taking the sensed characteristic into account to compensate for a variation in the flow rate by a closed-loop flow control.

16 Claims, 7 Drawing Sheets

(52) U.S. Cl.
CPC . *B01L 2200/027* (2013.01); *B01L 2200/0605* (2013.01); *B01L 2300/0627* (2013.01); *B01L 2400/082* (2013.01); *G01N 2021/0193* (2013.01)

(58) Field of Classification Search
CPC ..... B01L 2200/0605; B01L 2300/0627; B01L 2400/082; B01L 3/502715
USPC .................................. 422/504, 500; 436/174
See application file for complete search history.

(56) References Cited

FOREIGN PATENT DOCUMENTS

| | | |
|---|---|---|
| WO | 2015085262 A1 | 6/2016 |
| WO | 2016193758 A1 | 12/2016 |

FLOW CONTROL IN MICROFLUIDIC ROUTER

CROSS-REFERENCE TO RELATED APPLICATIONS

The present application is a national stage entry of PCT/EP2018/086141, filed Dec. 20, 2018, which claims priority to EP 17211262.5, filed on Dec. 31, 2017, and EP 18164310.7, filed on Mar. 27, 2018, the contents of each of which are hereby incorporated by reference.

FIELD

The present disclosure relates to the field of microfluidic devices. More specifically it relates to a microfluidic device for preparing a microfluidic flow of a fluid having objects of interest immersed therein and for routing the objects of interest in the microfluidic flow, a related cartridge, a related system and a related method.

Background

Microfluidic routing devices are useful for various applications, such as for use in cell router systems for detecting, sorting and/or characterizing biological entities of interest, for example target cells. Such a cell router system may be used as a generic or specific clinical tool, for example for quantification and cellular characterization of a target cell type. For example, the number of detected cells of a given target type can be an important clinical marker for therapy follow-up, for example follow-up of cancer metastasis and/or minimal residual diseases. Example applications of a cell router system include the analysis of a blood sample for chronic lymphocytic leukemia diagnosis or follow-up or for circulating tumor cell monitoring, the analysis of a bone marrow sample for myeloma diagnosis or follow-up, the analysis of a lymph node biopsy for Hodgkin disease diagnosis or follow-up, the analysis of a urine sample and/or the enrichment of a sample for sequencing.

A router system can also be used for detection and purification of entities of interest immersed in a microfluidic flow. For example, biological entities of interest (e.g., target cells) may be introduced in a microfluidic flow as a component of a mixture of multiple types of entities (e.g., a mixture of different cell types obtained from a crude sample). The isolation of the target entities from background entities may be utilized for downstream analysis (e.g. a specific analysis of the target cell, such as cell culturing, immunocytochemistry) DNA and/or RNA fluorescence in-situ hybridization and/or a next generation sequencing analysis. Such approach may find application in, for example, companion diagnostics, cell therapy and pathological research. For example, T-cells may be sorted from a blood sample for application in cell therapy, or specific sperm cells may be selected from a semen sample for application in sperm sexing.

Known methods include sample preparation, sorting of entities immersed in a fluid, and handling of such entities can be implemented in microfluidic chips. For example, a variety of sample preparation as well as particle sorting methods have been demonstrated in microfluidic chip technology.

In a processing flow, a fluid sample may be prepared by either a manual or an automated method. Such preparation method may comprise one or more enrichment steps, a staining step and/or a washing step. The prepared sample may then be introduced into a sorting module for separating out objects of interest, such as biological cells or other bio-entities of interest, from the fluid sample.

SUMMARY

Embodiments of the present disclosure provide methods for detecting, sorting, purifying and/or characterizing objects of interest in a liquid sample using an integrated microfluidic system.

Example embodiments of the present disclosure describe microfluidic flow, such as bio-particles in a fluid sample, can be sorted, analyzed, separated or otherwise processed in a quick and affordable device.

Example embodiments of the present disclosure describe a fluid sample preparation stage, for example a sample preprocessing stage, and a sample processing stage, for example a fluid handling stage in which objects of interest in the fluid are handled and/or sorted and/or analyzed, can be easily cointegrated in a device.

Example embodiments of the present disclosure describe an automated, efficient transfer of objects of interest in a fluid sample, for example of bio-particles in a microfluidic flow, can be transferred between different parts of a microfluidic chip, for example between different modules (e.g. between fluid preparation, fluid handling, fluid sorting and/or post-processing stages) with a low risk of sample losses, such as losses due to objects of interest in the microfluidic flow adhering to a wall of a tube during transfer.

Example embodiments of the present disclosure describe different stages in a microfluidic flow handling system (e.g., stages for preparing a fluid sample having objects of interest immersed therein) routing the fluid sample, sorting the objects of interest in the fluid sample, and/or post-processing the sorted objects of interest can be directly connected along a (or at least one) flow path.

Example embodiments of the present disclosure describe influence of the operation of a stage in a microfluidic flow handling system on the flow characteristics at an interface between that stage and a following stage, e.g. which influence could be difficult or impossible to predict, can be easily detected and/or compensated for.

Example embodiments of the present disclosure provide that the impact of flow fluctuations and/or deviations may be de-coupled between a sample preparation module (e.g. a sample preparation unit) and a sorting module (e.g. a sorting unit) such that independent fluidic operation can be achieved inside each module (e.g. each unit) while the modules (e.g. the units) can still be highly co-integrated.

Example embodiments of the present disclosure provide a robust performance of each module (e.g. each unit) in the microfluidic system is provided against interface fluctuations in operation of the system.

Example embodiments of the present disclosure provide that each module (e.g. each unit) can be modified, selected, and/or reconfigured in designing a microfluidic integrated system without strongly affecting a selection or parameters of the other module (e.g. the other unit). Thus, exchangeability and flexibility of each module (e.g. each unit) can be provided in a device development stage.

In a first aspect, the present disclosure relates to a method for detecting, sorting, purifying and/or characterizing objects of interest in a liquid sample. The method comprises preparing, in a preparation module (e.g. a preparation unit) of a microfluidic router system, a liquid sample in microfluidic flow that comprises the objects of interest for processing. The preparing comprises transporting the liquid sample through at least one microfluidic channel from at least one inlet of the preparation module to at least one outlet of the preparation module. The method also comprises forwarding the prepared liquid sample in microfluidic flow from the at least one outlet of the preparation module into at least one inlet of a routing module, e.g. a routing unit, of the microfluidic router system. This forwarding comprising coupling a microfluidic flow between the at least one outlet of the preparation module and the at least one inlet of the routing module such as to passively buffer against and/or actively compensate for variations in a flow rate of the prepared liquid sample in microfluidic flow at the at least one outlet of the preparation module. The method also comprises diverting, in the routing module of the microfluidic router system, the objects of interest from the microfluidic flow of the prepared liquid sample, for example such as to detect, sort, purify and/or characterize the objects of interest.

The forwarding of the liquid sample comprises: sensing a flow characteristic of the liquid sample in microfluidic flow in the preparation module and/or in the routing module and/or in a flow connection in between the preparation module and the routing module, and controlling at least one flow control element taking the sensed flow characteristic into account to compensate for a variation in the flow rate of the prepared liquid sample in microfluidic flow. This controlling comprises a closed-loop flow control to compensate for a deviation of the sensed flow characteristic from a predetermined target value of the flow characteristic.

A method in accordance with embodiments of the present disclosure may also comprise introducing the liquid sample comprising the objects of interest into the microfluidic router system.

In a method in accordance with embodiments of the present disclosure, the step of introducing may comprise injecting the liquid sample into the preparation module at a first pressure.

In a method in accordance with embodiments of the present disclosure, the step of diverting of the objects of interest may comprise injecting a further liquid, for example the same carrier liquid as used to carry the objects of interest in the liquid sample, into the microfluidic flow of the prepared liquid sample in the routing module at a second pressure.

In a method in accordance with embodiments of the present disclosure, the step of forwarding of the liquid sample may comprise injecting an auxiliary flow of a yet further liquid, for example the same carrier liquid as used to carry the objects of interest in the liquid sample, into the microfluidic flow in between the at least one outlet of the preparation module and the at least one inlet of the routing module at a third pressure.

A method in accordance with embodiments of the present disclosure may comprise controlling the first pressure and/or the second pressure and/or the third pressure.

A method in accordance with embodiments of the present disclosure may comprise monitoring and/or measuring the first pressure and/or the second pressure and/or the third pressure, for example using at least one pressure gauge.

A method in accordance with embodiments of the present disclosure may comprise monitoring and/or measuring a first flow rate indicative of the flow through the preparation module and/or a second flow rate indicative of the flow through the routing module and/or a third flow rate indicative of the auxiliary flow, for example using at least one flow meter, such as an acoustic flow sensor and/or a thermal flow sensor.

In a method in accordance with embodiments of the present disclosure, the step of preparing may comprise a sample enrichment step, a mixing step, a dilution step, an agitation step, a staining step, a cell lysis step and/or a cell dissociation step.

In a method in accordance with embodiments of the present disclosure, the diverting of the objects of interest from the microfluidic flow may comprise detecting an object of interest of the objects of interest in the microfluidic flow of the prepared liquid sample.

In a method in accordance with embodiments of the present disclosure, the detecting may comprise obtaining an optical detection signal, such as a fluorescence, a bright field, a dark field and/or a scatter signal and/or an image of the object, for example a microscopic image, a holographic image and/or a diffraction image.

In a method in accordance with embodiments of the present disclosure, the detecting may comprise detecting at least one characteristic feature of the object of interest in the optical detection signal.

In a method in accordance with embodiments of the present disclosure, the diverting of the objects of interest from the microfluidic flow may comprise calculating a routing signal in response to the detection of the at least one characteristic feature, and controlling an actuating element by the calculated routing signal to divert the detected object of interest away from a main component of the microfluidic flow.

In a method in accordance with embodiments of the present disclosure, the controlling may comprise activating the at least one flow control element in response to the sensed flow characteristic, for example such as to activate a stage or module (e.g. to activate a fluid source in that stage or module) when a moving liquid front is detected upstream of that stage or module.

In a method in accordance with embodiments of the present disclosure, the sensing of the flow characteristic may comprise measuring a flow speed, detecting a fluid presence and/or detecting a fluid optical parameter. For example, the flow characteristic may be a flow-front detection in which the presence of the liquid carrying the objects of interest is detected at the sensing location due to a change in light transmission, light reflection or similar optical properties.

In a method in accordance with embodiments of the present disclosure, the step of sensing the flow characteristic may comprise measuring, in the routing module, the flow rate of the prepared liquid sample in microfluidic flow.

A method in accordance with embodiments of the present disclosure may comprise injecting the liquid sample (or a further liquid) into the preparation module at a first pressure, wherein the step of controlling comprises adjusting the first pressure by taking the deviation of the flow rate from the predetermined target value into account.

In a method in accordance with embodiments of the present disclosure, the diverting of the objects of interest may comprise injecting a further liquid into the microfluidic flow of the prepared liquid sample in the routing module at a second pressure, and the step of controlling may comprise controlling the second pressure.

In a method in accordance with embodiments of the present disclosure, the step of controlling may comprise controlling at least one further pressure, for example of a further fluid source in a stage forming part of the preparation module.

In a method in accordance with embodiments of the present disclosure, the forwarding of the liquid sample may comprise injecting an auxiliary flow of a yet further liquid into the microfluidic flow in between the at least one outlet of the preparation module and the at least one inlet of the routing module at a third pressure, in which the step of controlling comprises adjusting the third pressure by taking the deviation of the flow rate from the predetermined target value into account.

In a method in accordance with embodiments of the present disclosure, the forwarding of the liquid sample from the at least one outlet of the preparation module into the at least one inlet of the routing module may comprise coupling the microfluidic flow between the at least one outlet of the preparation module and the at least one inlet of the routing module by a flow resistor having a flow resistance to passively buffer against variations in the flow rate of the prepared liquid sample in microfluidic flow at the at least one outlet of the preparation module.

In a method in accordance with embodiments of the present disclosure, the flow resistance of the flow resistor may be at least equal to a predetermined value that corresponds to an expected variation and/or fluctuation of a flow resistance of the preparation module and/or of the routing module.

In a second aspect, the present disclosure relates to a microfluidic routing device for preparing a microfluidic flow of a fluid having objects of interest immersed therein and for routing the objects of interest in the microfluidic flow, the device comprising:
- a sample preparation module, for example a sample preparation unit, adapted for preparing a liquid sample in microfluidic flow comprising the objects of interest for processing, the preparation module comprising at least one microfluidic channel, for transporting the liquid sample, that connects at least one inlet of the preparation module to at least one outlet of the preparation module;
- a routing module, for example a routing unit, for diverting the objects of interest from the microfluidic flow of the prepared liquid sample;
- a microfluidic connection for interconnecting the preparation module and the router module such as to forward the prepared liquid sample in microfluidic flow from the at least one outlet of the preparation module into at least one inlet of the routing module.

The preparation module and/or the routing module and/or the microfluidic connection is adapted for sensing a flow characteristic of the liquid sample in microfluidic flow, for example such that the flow characteristic can be sensed by an internal or external sensor, to control at least one flow control element taking the sensed flow characteristic into account by a closed-loop flow control to compensate for a deviation of the sensed flow characteristic from a predetermined target value of the flow characteristic.

The device may comprise the at least one flow control element, which may be adapted for receiving a control signal for controlling the at least one flow control element taking the sensed flow characteristic into account by a closed-loop flow control to compensate for a deviation of the sensed flow characteristic from a predetermined target value of the flow characteristic.

In a microfluidic routing device in accordance with embodiments of the present disclosure, the routing module may comprise an actuating element, for example distinct from the at least one flow control element, for diverting a detected object of interest away from a main component of the microfluidic flow in response to a routing signal.

In a microfluidic routing device in accordance with embodiments of the present disclosure, the microfluidic connection may comprise a flow resistor having a flow resistance and being adapted for passively buffering against variations in the flow rate of the prepared liquid sample in microfluidic flow at the at least one outlet of the preparation module.

A microfluidic routing device in accordance with embodiments of the present disclosure may comprise an inlet junction for the routing module, in which the inlet junction is adapted for injecting an auxiliary flow of a liquid into the microfluidic flow in between the at least one outlet of the preparation module and the at least one inlet of the routing module.

In a third aspect, the present disclosure relates to a microfluidic router system comprising a microfluidic routing device in accordance with embodiments of the second aspect of the present disclosure and an instrumentation device. The microfluidic router system comprises at least one sensor for sensing a flow characteristic of the liquid sample in microfluidic flow in the preparation module and/or in the routing module and/or in the microfluidic connection. The microfluidic router system comprises a first fluid actuator for injecting the liquid sample into the preparation module at a first pressure and/or a second fluid actuator for injecting a liquid into the microfluidic flow of the prepared liquid sample in the routing module at a second pressure and/or a third fluid actuator for injecting an auxiliary flow of a liquid into the microfluidic flow in between the at least one outlet of the preparation module and the at least one inlet of the routing module at a third pressure and/or at least one further fluid actuator for injecting at least one further liquid into the preparation module at at least one further pressure. The instrumentation device comprises a controller for controlling the first pressure and/or the second pressure and/or the third pressure and/or the at least one further pressure.

The controller is adapted for performing a closed-loop flow control to compensate for a deviation of the sensed flow characteristic from a predetermined target value of the flow characteristic.

In a microfluidic router system in accordance with embodiments of the present disclosure, the controller may be adapted for adjusting the first pressure and/or the third pressure by taking a deviation of the flow rate indicative of the flow into or through the routing module from the predetermined target value into account.

In a further aspect, the present disclosure relates to a diagnostic device comprising a microfluidic routing device in accordance with embodiments of the present disclosure and/or a microfluidic router system in accordance with embodiments of the present disclosure. The diagnostic device may be adapted for detecting, sorting and/or characterizing biological entities of interest, such as target cells. The diagnostic device may be adapted for use as a generic or specific clinical tool, for example for quantification and cellular characterization of a target cell type.

The diagnostic device may be adapted for analysing a body tissue sample and/or a body fluid sample, for example a blood sample, a saliva sample, a urine sample, a semen sample, a lymphatic liquid sample, a faeces sample, a bone marrow sample and/or another sample obtained from the human or animal body.

Some aspects of the disclosure are set out in the accompanying independent and dependent claims. Features from the dependent claims may be combined with features of the independent claims and with features of other dependent claims and not merely as explicitly set out in the claims.

These and other aspects of the disclosure will be apparent from and elucidated with reference to the embodiment(s) described hereinafter.

Figure 1:
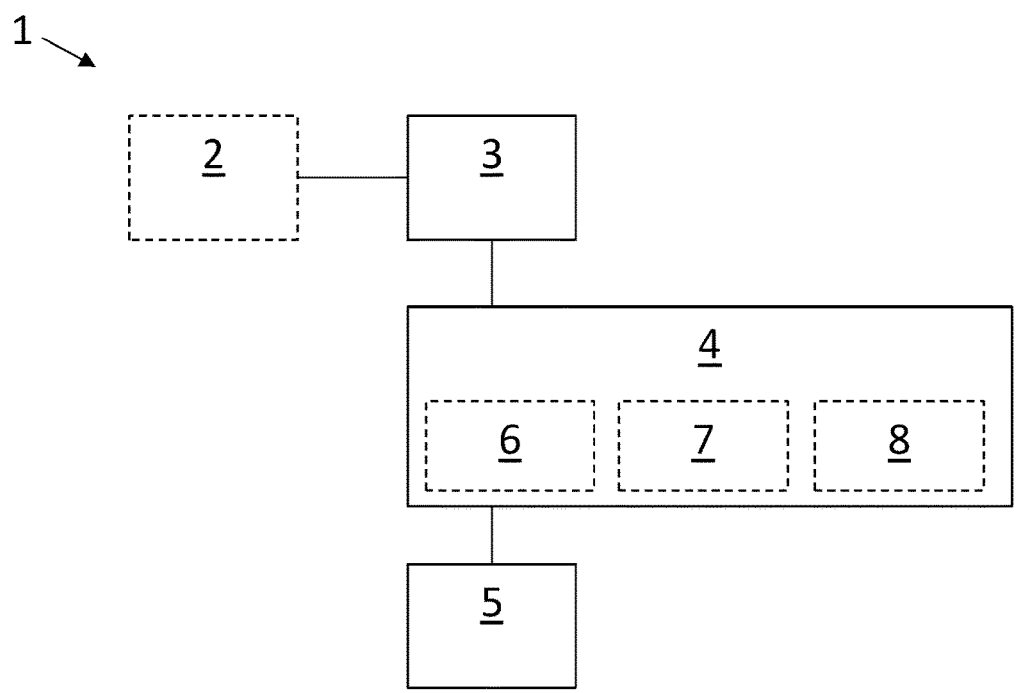
FIG. 1 shows an example method in accordance with embodiments of the present disclosure.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under certain circumstances and that the embodiments of the disclosure described herein are capable of operation in other sequences than described or illustrated herein.

Moreover, the terms top, under and the like in the description and the claims are used for descriptive purposes and not necessarily for describing relative positions. It is to be understood that the terms so used are interchangeable under certain circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of example embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, known methods, structures and techniques have not been shown in detail in order not to obscure an understanding of this description.

References to a 'module' in the present description refer to a functional unit, for example which can be readily integrated in a more complex system, such as a cartridge.

In a first aspect, the present disclosure relates to a method for detecting, sorting, purifying and/or characterizing objects of interest in a liquid sample. The method comprises preparing, in a preparation module of a microfluidic router system, a liquid sample in microfluidic flow that comprises the objects of interest for processing. The step of preparing the liquid sample comprises transporting the liquid sample through at least one microfluidic channel from at least one inlet of the preparation module to at least one outlet of the preparation module.

The method also comprises forwarding the prepared liquid sample in microfluidic flow from the at least one outlet of the preparation module into at least one inlet of a routing module of the microfluidic router system, in which this forwarding comprises coupling a microfluidic flow between the at least one outlet of the preparation module and the at least one inlet of the routing module such as to passively buffer against and/or actively compensate for variations in a flow rate of the prepared liquid sample in microfluidic flow at the at least one outlet of the preparation module.

The method also comprises diverting, in the routing module of the microfluidic router system, the objects of interest from the microfluidic flow of the prepared liquid sample.

Forwarding the liquid sample comprises sensing a flow characteristic of the liquid sample in microfluidic flow in the preparation module and/or in the routing module and/or in a flow connection in between the preparation module and the routing module, and controlling at least one flow control element taking the sensed flow characteristic into account to compensate for a variation in the flow rate of the prepared liquid sample in microfluidic flow. This controlling comprises a closed-loop flow control to compensate for a deviation of the sensed flow characteristic from a predetermined target value of the flow characteristic.

Referring to FIG. 1, an example method 1 in accordance with embodiments of the present disclosure is shown. The method 1 is a method for detecting, sorting, purifying and/or characterizing objects of interest in a liquid sample, i.e. entities of interest in a liquid sample. For example, the objects of interest may comprise biological entities of interest in a liquid sample, such as a body fluid sample. For example, the method may be a method for detection and purification of the objects of interest immersed in a microfluidic flow. For example, the method may be a method for biological cell sorting and/or biological cell routing for clinical applications.

Figure 8:
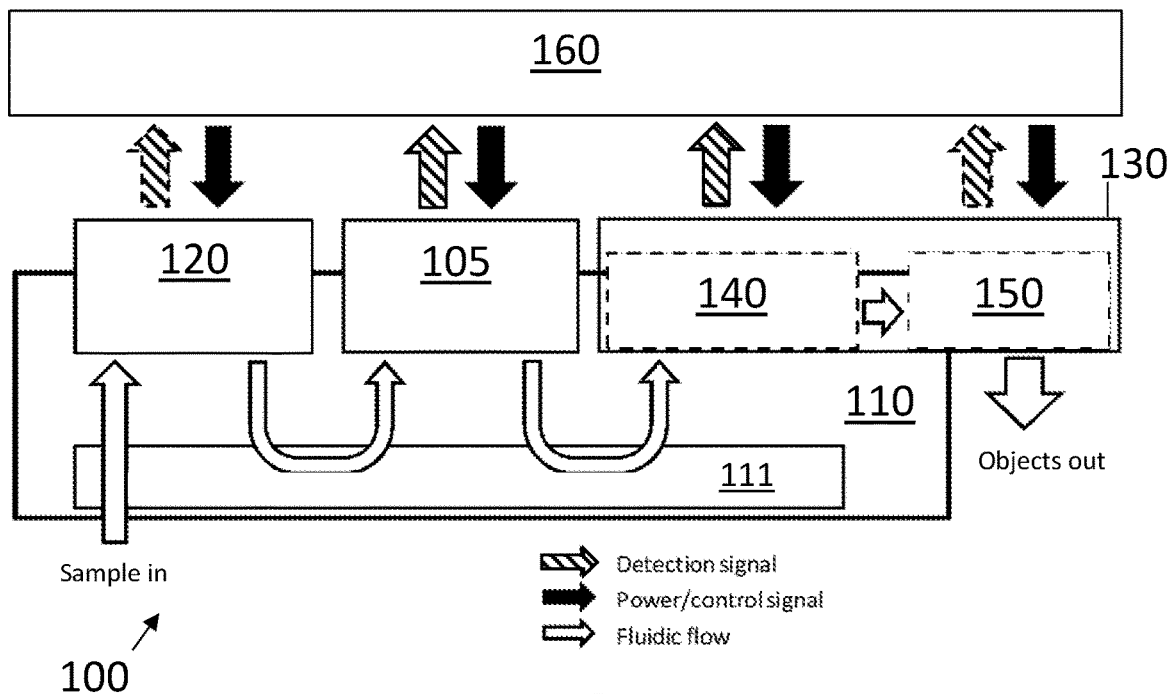
FIG. 8 illustrates a microfluidic router system in accordance with embodiments of the present disclosure.

For example, the method 1 may comprise introducing 2 a liquid sample comprising the objects of interest into a microfluidic router system 100, for example as illustrated in FIG. 8. The microfluidic router system may comprise, for example may comprise at least, a preparation module 120 and a routing module 105. The microfluidic router system may comprise a microfluidic connection, for example a flow resistor 115, between the preparation module and the routing module. By integrating the preparation module and the routing module in a single integrated microfluidic router device, losses of (some of) the objects of interest in the liquid sample during transfer and/or manipulation between different stages, for example between a preparation stage and a routing stage, can be kept low or even substantially prevented.

The microfluidic router system, for example a cell router system, may comprise a microfluidic routing device 110, for example in the form of a cartridge. This microfluidic routing device 110 may have an integrated sample preparation module 120 and an integrated router module 105, for example a cell router module, for example for biological cell sorting. The microfluidic routing device 110 may comprise microfluidic, electrical and/or optical connections 111 between the modules and/or other components in the cartridge.

The preparation module (e.g. for biological cell enrichment), and the router module (e.g. for biological cell routing) may be interconnected by microfluidic means (e.g., one or more microfluidic channels) in an integrated cartridge. For example, the microfluidic means (e.g. the at least one interconnecting microfluidic channel), may have a minimum cross-sectional dimension (e.g. a channel width, height and/or diameter) in the range of 1.1 (e.g. 1.5), times the size of the object of interest (e.g. of the target cell to about 2 mm. For example, the cross-sectional dimensional may be in the range of 30 µm to 1 mm (e.g. in the range of 50 µm to 500 µm). For example, this may be a suitable range for biological entities of interest, such as cells, which are typically smaller than 50µ. Particularly, the preparation module and the router module may be interconnected without any intermediate reservoir, container or buffer that has a cross-sectional dimension (e.g. relative to the general sense of flow from the preparation module to the routing module) that is larger than or equal to 5 mm (e.g. larger than or equal to 2 mm and/or larger than or equal to 1 mm).

The microfluidic router system may also comprise an instrument, in which the routing device can be mounted in the instrument for analysis or processing of a sample. The microfluidic routing device may be disposable, for example may be a single-use cartridge. The microfluidic routing device may comprise functional components for physically handling the sample, for example sample and/or reagent tanks, cell preparation components, cell routing elements and/or post-sorting processing components. The instrument may comprise all peripheral hardware and/or software to facilitate the operation of the microfluidic routing device, for example for system level control and to provide a user interface, for actuation and control of the fluidics in the routing device, for optical detection of a light source and signal processing for fluorescence detection and/or cell imaging, for control and driving of the in-cartridge electrical components of the routing device, and/or for post-sorting cell dispensing, for example to transfer sorted cells to vials or onto glass slides in a sorted cell suspension. Particularly, the hardware of the instrument may be designed to avoid physical contact with the sample, for example to improve sample processing accuracy with minimal possibility of sample contamination.

Introducing 2 the liquid sample comprising the objects of interest into the microfluidic system may comprise injecting the liquid sample into the preparation module at a pressure Ps. The pressure Ps may be a predetermined pressure, or may be a controllable pressure. For example, in embodiments in accordance with the present disclosure, the method may comprise controlling the pressure Ps, for example as described further hereinbelow. The method may also comprise monitoring, for example measuring, the pressure Ps, for example using a pressure gauge.

The method comprises preparing 3, in a preparation module 120 of a microfluidic router system 100, a liquid sample for processing. The liquid sample is in microfluidic flow and comprises the objects of interest.

The step of preparing 3 the liquid sample comprises transporting, for example continuously transporting, the liquid sample through at least one microfluidic channel from at least one inlet of the preparation module 120 to at least one outlet of the preparation module 120.

Preparing 3 the liquid sample may comprise an enrichment of the objects in the fluid sample (e.g. such as to increase the concentration of the objects of interest in fluid sample) for example by decreasing the volume of the sample without reducing the number of the objects of interest therein substantially, or at least to keep losses of the objects of interest within acceptable limits.

A volumetric flow rate of the liquid sample in microfluidic flow may differ by at least a factor 5 between the at least one outlet of the preparation module and the at least one inlet of the preparation module. For example, the (total) volumetric flow rate over the (or all) outlet(s) of the preparation module, disregarding outlets for waste disposal, may be substantially lower than the (total) volumetric flow rate over the (or all) inlet(s) of the preparation module. More in general, a large difference may exist between the volumetric flow rate via at least one inlet and the volumetric flow rate via at least one outlet, for example such that either one is substantially larger than the other one. Example embodiments of the present disclosure provide such large disparity between an inflow and an outflow and may be handled effectively and efficiently in an continuous or stepwise continuous flow system.

Furthermore, at least one outlet of the preparation module may be connected to at least one input of the routing module such as to forward a prepared liquid sample in microfluidic flow from the preparation module to the routing module. While the volumetric flow in this at least one outlet of the preparation may be substantially lower than the volumetric flow that is injected into the preparation module, as discussed hereinabove, for example due to the removal of a large fraction as waste effluent, the flow obtained from this at least one outlet of the preparation module may be joined with at least one further fluid flow in the routing module (e.g. of a fluid used as carrier and/or directional flow control medium). Thus, also the routing module may involve a large relative difference in volumetric flow between the total flow through the routing module and the prepared liquid sample received from the preparation module. It is to be noted that such changes in magnitude of the primary flow of interest throughout the preparation module and the routing module may benefit from an accurate and efficient way of synchronizing various stages in a serial flow arrangement, for example as provided by embodiments of the present disclosure.

The method may also comprise monitoring, for example measuring, a flow rate Qs indicative of the flow through the preparation module (e.g. at the at least one outlet of the preparation module). For example, monitoring the flow rate Qs may comprise measuring the flow rate using a flow meter (e.g. an acoustic flow sensor and/or a thermal flow sensor).

The method may also comprise monitoring, for example measuring, a flow rate Qr indicative of the flow through the routing module (e.g. at the at least one inlet of the routing module). For example, monitoring the flow rate Qr may comprise measuring the flow rate using a flow meter, for example an acoustic flow sensor and/or a thermal flow sensor. Alternatively, the flow rate Qr may be estimated from a detected speed and/or detection frequency of detected objects in flow in the routing module.

The liquid sample may be manipulated in the step of preparing the liquid sample, for example by a sample enrichment step, a mixing step, a dilution step, and/or an agitation (without mixing) step. The liquid sample, which may comprise biological objects of interest such as biological cells, may be manipulated in the step of preparing the liquid sample by, for example, a staining step, for example for microscopic imaging and/or fluorescence characterization, a cell lysis step and/or a cell dissociation step. The step of preparing the liquid may comprise any suitable combination of these operations, and/or of other similar operations. The steps and/or parameters of a suitable liquid sample preparation, as well as of a routing operation referred to hereinbelow, may be substantially determined by the nature of the sample liquid, of the objects of interest, of the intended application of the method, for example as can be determined by the skilled person in practice without exerting an inventive effort based on the application disclosures.

The method also comprises forwarding 4, for example continuously forwarding, the prepared liquid sample in microfluidic flow from the at least one outlet of the preparation module 120 into at least one inlet of a routing module 105 of the microfluidic router system 100, for example via a microfluidic connection between the modules.

For example, losses of the objects of interest, for example of bioparticles such as cells, may be reduced (e.g. kept low) by providing a direct connection for maintaining a continuous flow of the sample between the sample preparation module and the routing module.

The step of forwarding 4 the liquid sample from the at least one outlet of the preparation module into the at least one inlet of the routing module comprises coupling a microfluidic flow, for example by a microfluidic flow connection, between the at least one outlet of the preparation module and the at least one inlet of the routing module such as to passively buffer against and/or actively compensate for variations in a flow rate of the prepared liquid sample in microfluidic flow at the at least one outlet of the preparation module. Thus, a less variable and/or more stable flow rate of the prepared liquid sample in microfluidic flow can be provided at the at least one inlet of the routing module.

Therefore, a 'smart' connection may be provided between the preparation module and the routing module to decouple variations in flow parameters in one module from having an impact on the operation of the other module, for example insofar the variations are within predetermined, reasonable margins that can be expected in normal operation of the device and insofar the influence of one module on the other is reduced sufficiently such that that a normal operation of that module can be expected within operational tolerance margins.

For example, without such coupling to buffer against and/or actively compensate for variations in a pressure, a flow rate, a flow resistance and/or other fluid-dynamic parameters, such fluctuating flow conditions in one module could adversely affect the proper operation of the other module.

The method also comprises diverting 5, in the routing module of the microfluidic router system, the objects of interest from the microfluidic flow of the prepared liquid sample.

For example, the objects of interest may be diverted 5 from the microfluidic flow of the prepared liquid sample such as to sort out the objects of interest from another type of objects or other types of objects present in the microfluidic flow of the prepared liquid sample.

Diverting 5 the objects of interest may comprise detecting an object of interest in the microfluidic flow of the prepared liquid sample, for example at one or more predetermined locations in the routing module. This detecting may comprise an optical detection, such as a fluorescence signal detection. For example, biological entities may be stained during the preparation step with a fluorescent dye, and a characteristic of the dyed object of interest may be optically detected while the object moved through the in the routing module. The optical detection may also comprise another type of optical detection, for example of a bright field signal, a dark field signal and/or a scatter signal. The optical detection may also comprise detecting an image of the object, for example a conventional image (e.g. a microscopic image, a holographic image or a diffraction image). The step of detecting may comprise detecting at least one characteristic feature of the object of interest in an optical detection signal, for example in a fluorescence signal, an optical signal, a scatter signal and/or an image.

Diverting 5 the objects of interest may comprise calculating a routing signal in response to the detection of the object of interest, for example when the at least one characteristic feature of the object of interest is detected in the optical detection signal. For example, a signal may be calculated to control an actuating element at a suitable time, for example after a suitable delay for taking into account the movement of the object from the location of detection to a location where it is to be diverted from a main component of the microfluidic flow via the actuating element. Furthermore, the signal may be calculated to control the actuating element for a suitable duration, for example taking into account a flow speed, a size, a mass and/or a volume of the object of interest. Furthermore, the signal may be calculated to control the actuating element by a suitable intensity, for example a force exerted by the actuating element on the object of interest may depend on a signal strength of a control signal supplied to the actuating element.

Diverting 5 the objects of interest may comprise controlling the actuating element by the calculated control signal to divert the detected object of interest away from a main component of the microfluidic flow.

Diverting 5 the objects of interest may comprise injecting, for example and mixing, a liquid into the microfluidic flow of the prepared liquid sample in the routing module. For example, the liquid may be injected at a pressure Pr. The pressure Pr may be a predetermined pressure, or may be a controllable pressure. For example, in embodiments in accordance with the present disclosure, the method may comprise controlling the pressure Pr, for example as described further hereinbelow. The method may also comprise monitoring, for example measuring, the pressure Pr, for example using a pressure gauge.

The liquid, for example a carrier fluid e.g. water or another suitable solvent may be added at or near the inlet of the routing module.

The liquid, for example a carrier fluid such as water or another suitable solvent, may also be added near the middle or near the end of the routing module (relative to the direction of flow).

The step of forwarding 4 the liquid sample from the at least one outlet of the preparation module into the at least one inlet of the routing module may comprise coupling the microfluidic flow between the at least one outlet of the preparation module and the at least one inlet of the routing module by a passive flow resistor 115 to passively buffer against variations in the flow rate of the prepared liquid sample in microfluidic flow at the at least one outlet of the preparation module. Particularly, the passive flow resistor may add a substantially constant reference flow resistance to the total flow resistance (for example of a serial flow connection) to buffer against large relative changes in, i.e. to stabilize, the total flow resistance.

For example, such passive flow resistor may form a microfluidic connection between the modules to isolate the impact of one module to the other with respect to variations in flow rate.

The passive flow resistor may comprise at least one microfluidic channel that has a cross-sectional dimension, for example a channel width, height and/or diameter, in the range of 1.1 (e.g. 1.5) times the size of the object of interest (e.g. the target cell to about 2 mm. For example, the cross-sectional dimension may lie in the range of 10 μm to 1 mm. For example, the passive flow resistor may be configured in accordance with a range of flow resistance that is to be achieved for a particular embodiment, for example by selecting a diameter of the at least one microfluidic channel. Furthermore, a length of the at least one microfluidic channel may be selected to more accurately achieve a desired predetermined flow resistance value. The passive flow resistor may be closely integrated in the preparation module and/or in the router module, or as a separate component functionally coupled in between the preparation module and the router module, for example in a cartridge comprising the preparation module and the router module.

Particularly, the preparation module and the router module may be interconnected without any intermediate reservoir, container or buffer that has a cross-sectional dimension, for example relative to the general sense of flow from the preparation module to the routing module, that is larger than or equal to 5 mm, for example larger than or equal to 2 mm (e.g. larger than or equal to 1 mm).

The flow resistance of the flow resistor may be at least equal to a predetermined value that corresponds to an expected variation or fluctuation of the flow resistance of the preparation module and/or the routing module.

Figure 2:
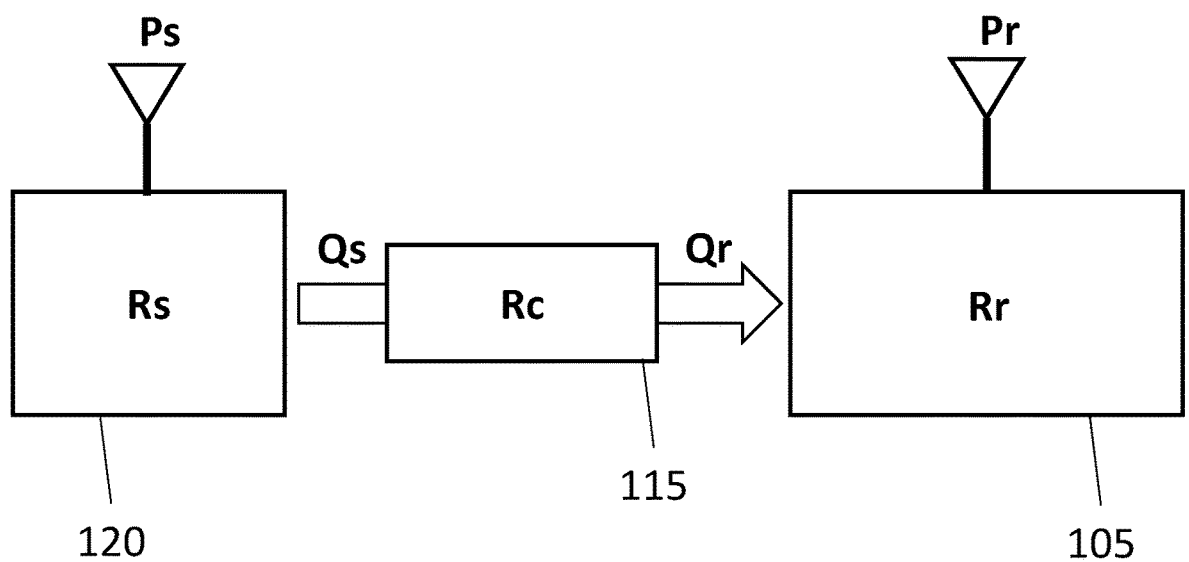
FIG. 2 illustrates a preparation module passively coupled to a routing module via a flow resistor, in accordance with embodiments of the present disclosure.

Referring to FIG. 2, the preparation module 120 may have a flow resistance Rs, e.g. a flow resistance of Rs between the at least one inlet and the at least one outlet of the preparation module. Likewise, the routing module 105 may have a flow resistance Rr.

The flow resistances Rs, Rr of the preparation module and the routing module are subject to variations and/or fluctuations, e.g. a stochastically distributed and/or unstable. Furthermore, the pressure Ps at which the sample fluid in injected into the preparation module may also be subject to such variations and/or fluctuations. For example, such variations and/or fluctuations may be caused by partial channel clogging and/or declogging, a presence and/or clearance of bubbles, differences in a tightness of fitting, or a transition between different sample preparation steps. For example, in a continuous sample preparation, later processing elements may remain inactive until a moving fluid front reaches that processing element. Therefore, flow characteristics may change when such initially inactive elements start participating in the processing of the continuous flow. It is difficult, or even impossible, to predict such variations and/or fluctuations. Embodiments of the present disclosure may provide methods for achieving a stability within operational tolerances) of the flow rate Qr in the routing module, for example at the inlet of the routing module. A flow connection between the preparation module 120 and the routing module 105 may be formed by a flow resistor 115, having a flow resistance Rc. Since the preparation module 120 and the routing module 105 are directly connected via the flow resistor 115, for example such that a series connection is formed. Therefore, the flow rate Qs at the outlet(s) of the preparation module 120 may be equal to the flow rate Qr at the inlet(s) of the routing module 105. The total flow resistance between the inlet(s) of the preparation module 120 and the outlet(s) of the routing module 105 is therefore Rtotal=Rs+Rc+Rr.

By providing a relatively large flow resistance Rc between the preparation module and the routing module, fluctuations and/or deviations (from a reference value) of the resistances Rs, Rr of the preparation module and the routing module can be stabilized, for example such that an impact of a variation ΔRs,ΔRr in the resistance of the preparation module and/or of the routing module on the flow rate Qs=Qr can be kept low, (e.g. can be reduced or minimized).

The resistance value Rc may be at least equal to, for example larger by a factor 2, 3, 5 or 10 than, the variations or fluctuations ΔRs, ΔRr in the flow resistances of the preparation module and/or the routing module.

The pressure Pr of the liquid, for example the secondary carrier liquid, injected in the routing module into the microfluidic flow may be determined by $Pr=Ps-Qs * (Rs+Rc)$, for example when the liquid is injected at or near the inlet(s) of the routing module.

The pressure Pr may be determined by $Pr=Ps-Qs * (Rs+Rc+0.5*Rr)$, for example when the liquid is injected at or near the middle of the routing module.

The step of forwarding 4 the liquid sample from the at least one outlet of the preparation module into the at least one inlet of the routing module may comprise sensing 6 a flow characteristic of the liquid sample in microfluidic flow in the preparation module and/or the routing module and/or in a flow connection between the modules, for example using a flow sensor, and controlling 7 at least one flow control element taking the sensed flow characteristic into account to compensate for a variation in the flow rate of the prepared liquid sample in microfluidic flow, for example such variation of the flow rate at the at least one outlet of the preparation module.

In embodiments of the present disclosure, the flow characteristic of the liquid sample may be a flow speed measured at the sensing location. However, embodiments of the present disclosure are not limited thereto. For example, the flow characteristic may be a fluid presence detection or a fluid optical parameter detection.

The flow characteristic, for example the flow speed, the fluid presence or another parameter indicative of the flow, may be determined by an optical measurement, an electrical measurement, such as an impedance measurement, or the detection of another physical property related to the flow. For example, an impedance may be measured between at least two electrodes that are in electrical contact with the fluid when present in the microfluidic channel, for example at least two electrodes in or on the wall of the microfluidic channel. For example, a change (e.g. a drop) in impedance may be detected when the fluid is at the sensing location in the channel.

Figure 6:
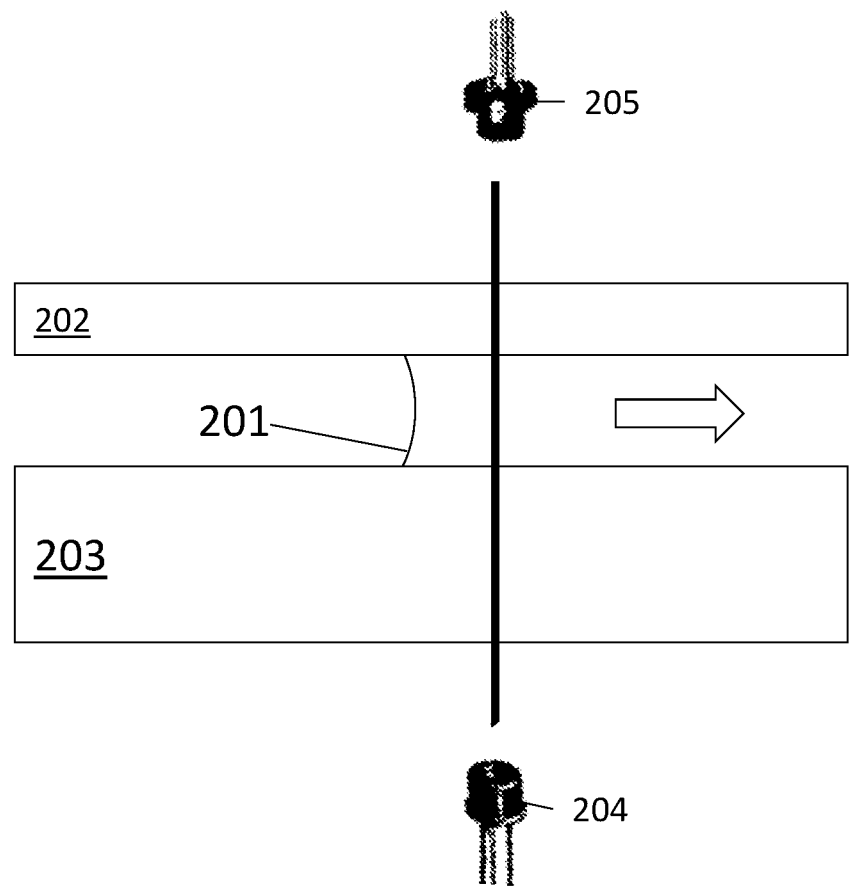
FIG. 6 shows a flow-front detection using a light barrier, illustrating embodiments of the present disclosure.
Figure 7:
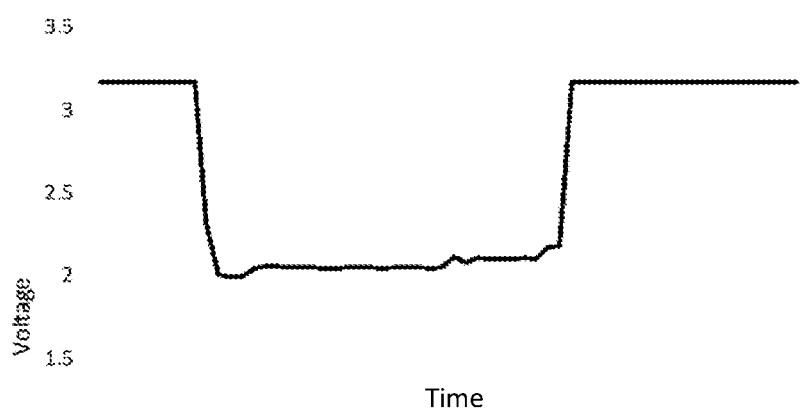
FIG. 7 shows a detection signal of a light barrier for flow-front detection, illustrating embodiments of the present disclosure.

For example, the flow characteristic may be a flow-front detection in which the presence of the liquid carrying the objects of interest is detected at the sensing location due to a change in light transmission, light reflection or similar optical properties. For example, the flow characteristic may be such flow-front detected by a light barrier as illustrated in FIG. 6. In this example, a moving front 201 of the liquid, in a microfluidic channel, for example defined between a cover glass or film 202 and a plastic cartridge 203, can be detected by a change in a signal detected by a photodetector 204 caused by a change in transmission through the microfluidic channel of light emitted by a diode laser 205, for example as demonstrated by FIG. 7. The step of controlling may comprise controlling the pressure Ps, the pressure Pr, the pressure Pa and/or at least one further pressure Px, for example of a further fluid source in a stage forming part of the preparation module.

The step of controlling may comprise activating the at least one flow control element in response to the sensed flow characteristic, for example such as to activate a stage or module (e.g. to activate a fluid source in that stage or module) when a moving liquid front is detected upstream of the that stage or module, for example to synchronize a stage to the fluid movement throughout the module.

For example, forwarding 4 the liquid sample may comprise controlling the at least one flow control element in a closed-loop flow control approach to compensate for a deviation of the sensed flow characteristic from a predetermined target value of the flow characteristic.

For example, the at least one flow control element may comprise an actuation element (e.g. a microfluidic valve or a microfluidic switch).

For example, the at least one flow control element may comprise a flow source (e.g. a secondary flow source). For example, the at least one flow control element may comprise a controllable fluid pump.

Figure 3:
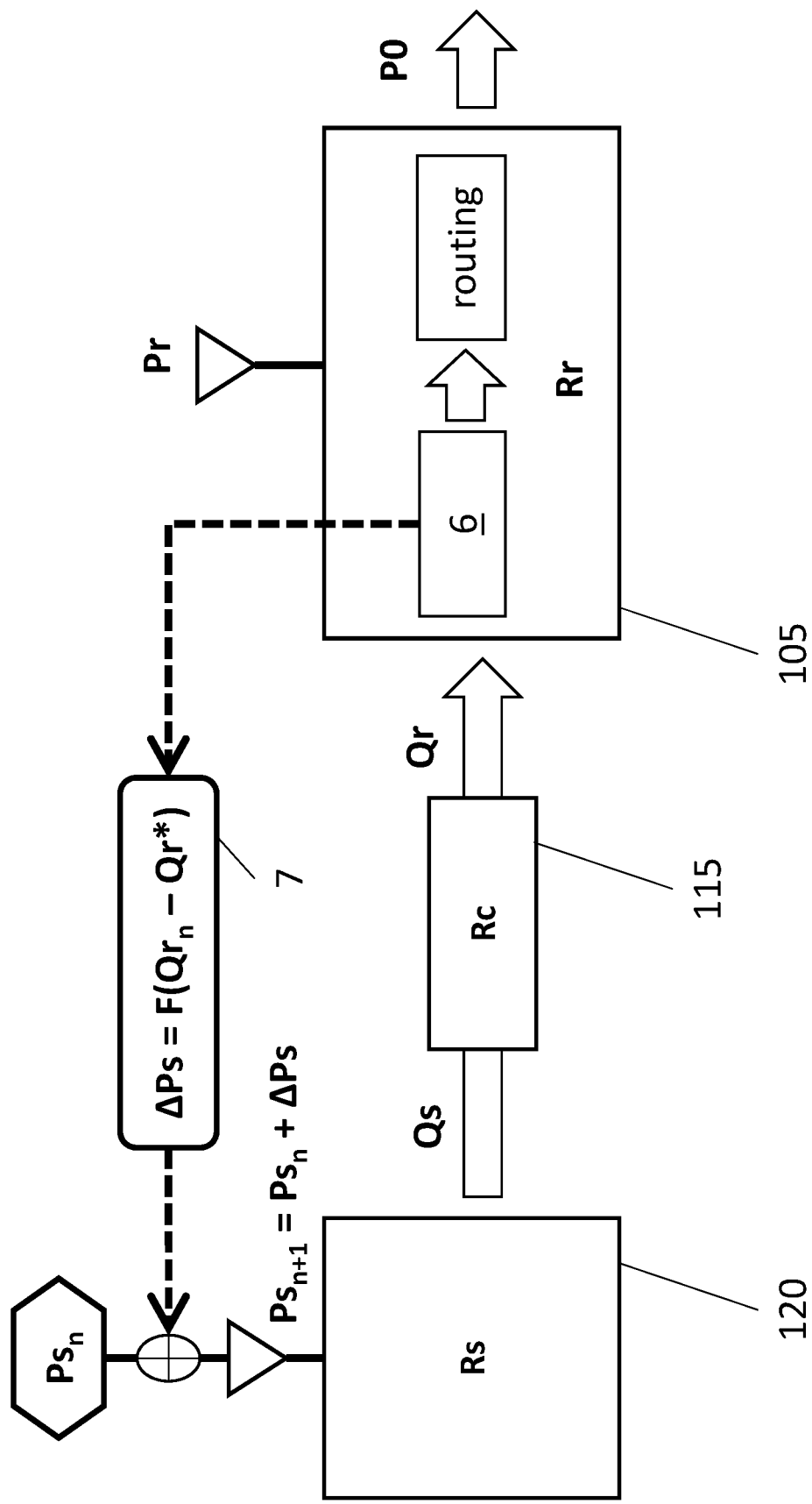
FIG. 3 illustrates a closed-loop flow control approach to adjust a first pressure taking a flow rate measurement into account, in accordance with embodiments of the present disclosure.

Referring to FIG. 3, a flow characteristic may be measured 6, such as the flow rate Qr. The flow rate may be measured in the routing module 105, for example near or at the inlet(s) of the routing module. However, for example where the connection between the sample preparation module and the routing module is formed by a passive flow resistor such that the preparation module, the flow resistor and the routing module form a series flow connection, the flow rate $Qs=Qr$ may be measured at any suitable point along the serial flow path.

Furthermore, at least one flow control element may be controlled 7, taking the sensed flow characteristic into account to compensate for a variation in the flow rate of the prepared liquid sample in microfluidic flow.

For example, this controlling 7 may comprise adjusting a pressure Ps at which the liquid sample is injected into the preparation module, for example by, in a time step n, determining a new pressure $Ps_n$ to be applied.

For example, the pressure $Ps_n$ may differ from a pressure applied in a previous time step Psn-1 by a difference $\Delta Ps=Ps_n - Ps_{n-1}$. For example, this difference may be determined by calculating a value dependent on the difference between the measured flow characteristic and a predetermined target value of the flow characteristic, for example a difference between the measured flow rate Qr and a setpoint Qr*. For example, a difference of the flow rate $Qr_n$ measured in a time step n and the setpoint Qr* may be used as argument for a function F to calculate the pressure difference $\Delta Ps$. The function F may be a linear scaling function, for example the difference Qr-Qr* may be multiplied by a predetermined scaling factor. The function F may also be a non-linear function, for example a monotonously increasing, or an increasing, function. The function F may be unbiased, for example may map a zero argument onto a zero function value. The function F may be antisymmetric, for example such that $F(-x)=-F(x)$. For example, the function F may be implemented by a proportional-integral-derivative (PID) method e.g. may be implemented by a PID controller).

Alternatively or additionally, a pressure Pr of the liquid, for example the secondary carrier liquid, injected in the routing module into the microfluidic flow may be controlled 7.

For example, the pressure Pr may be determined by $Pr=Ps-Qs * (Rs+Rc)$ (e.g., when the liquid is injected at or near the inlet(s) of the routing module) or may be determined by $Pr=Ps-Qs * (Rs+Rc+0.5*Rr)$, for example when the liquid is injected at or near the middle of the routing module.

When the actual Qr, for example the value $Qr_n$ of Qr in a time step n, deviates from the setpoint Qr*, regardless of the reason for such deviation, a closed-loop flow rate control algorithm may adjust a pressure, for example the pressure Ps, to increase or decrease the flow rate $Qs=Qr$.

Thus, an output pressure PO of the routing module may be maintained at or near a reference pressure by a method in accordance with embodiments of the present disclosure.

Figure 4:
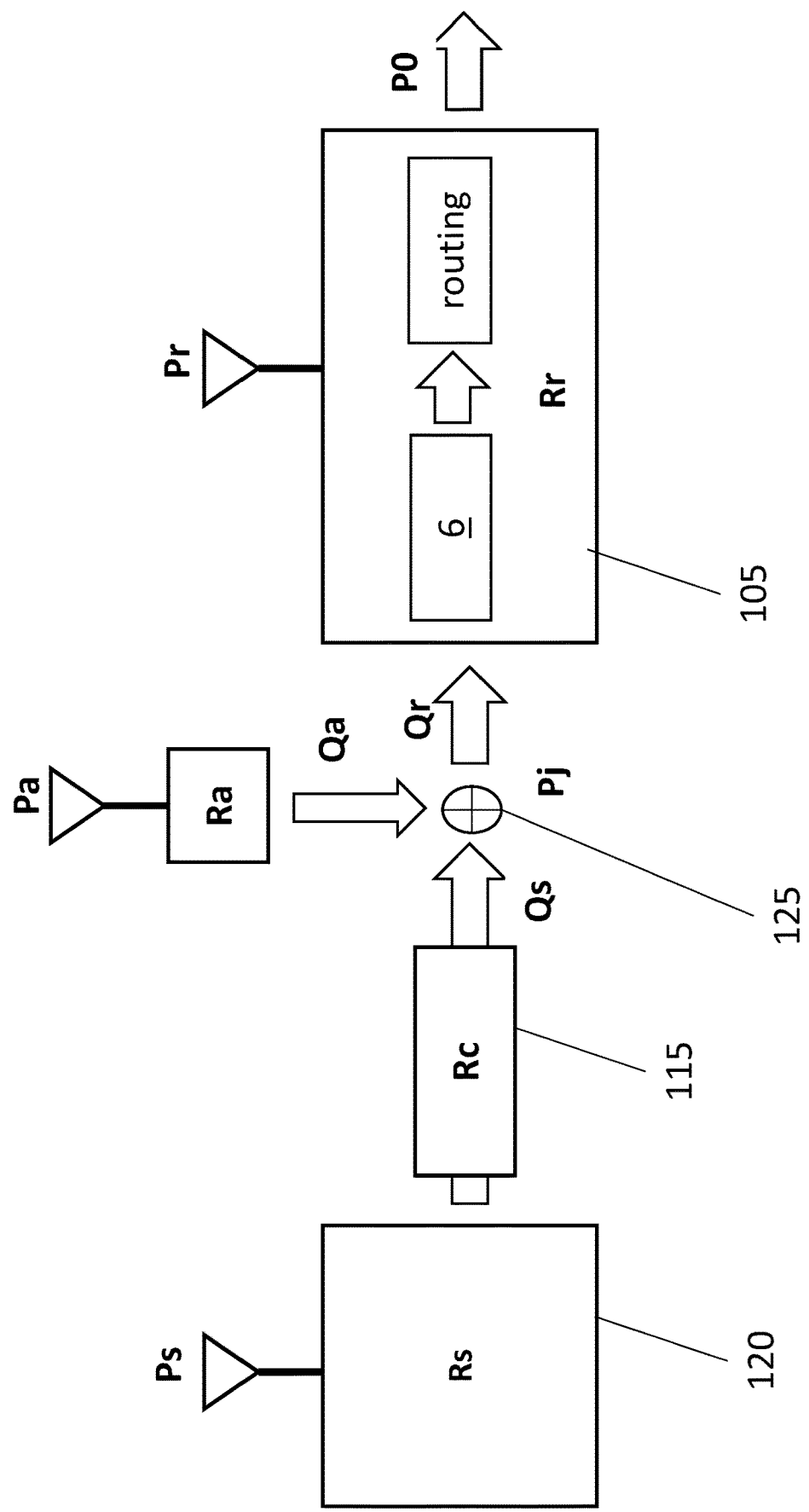
FIG. 4 illustrates an auxiliary flow source for stabilizing the flow rate at the inlet(s) of a routing module, in accordance with embodiments of the present disclosure.
Figure 5:
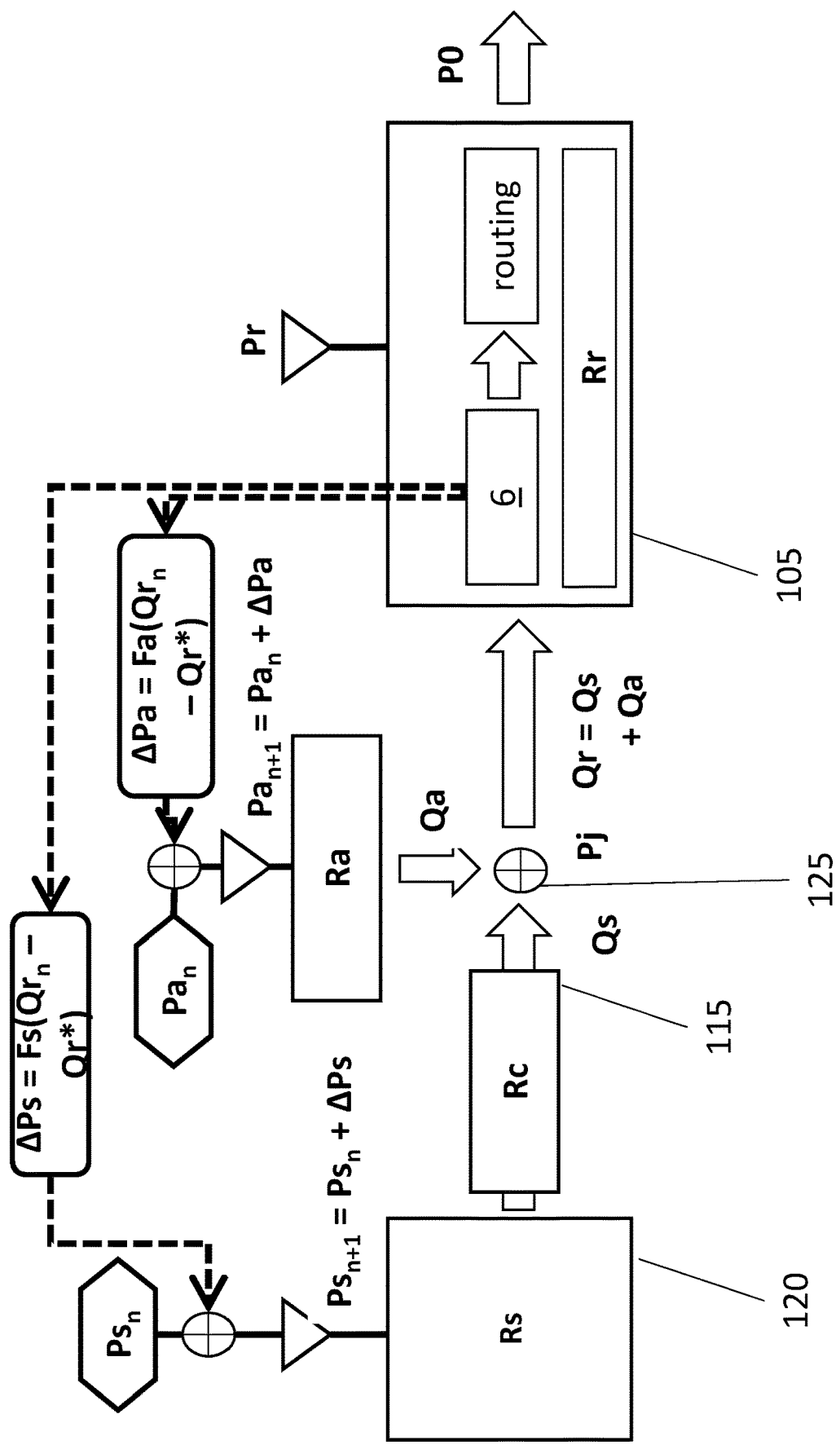
FIG. 5 illustrates a closed-loop flow control approach to adjust an auxiliary flow pressure taking a flow rate measurement into account, in accordance with embodiments of the present disclosure.

Referring to FIG. 4 and FIG. 5, in a method in accordance with embodiments of the present disclosure, the step of forwarding 4 the liquid sample from the at least one outlet of the preparation module into the at least one inlet of the routing module may comprise injecting 8 an auxiliary flow of a liquid, for example a carrier fluid water or another suitable solvent) into the microfluidic flow in between the at least one outlet of the preparation module and the at least one inlet of the routing module. For example, at an inlet junction 125 of the routing module, the microfluidic flow of the prepared liquid sample carrying the objects of interest to be routed may be joined with the auxiliary flow.

Injecting 8 the auxiliary flow may comprise injecting a liquid into a junction between the preparation module and the routing module (e.g. between the flow resistor and the routing module) at a pressure Pa. The pressure Pa may be a predetermined pressure, or may be a controllable pressure. For example, in embodiments in accordance with the present disclosure, the method may comprise controlling the pressure Pa, for example as described further hereinbelow. The method may also comprise monitoring, for example measuring, the pressure Pa (e.g. using a pressure gauge).

The method may also comprise monitoring (e.g. measuring) a flow rate Qa indicative of the auxiliary flow. For example, monitoring the flow rate Qa may comprise measuring the flow rate using a flow meter (e.g. an acoustic flow sensor and/or a thermal flow sensor).

In a method in accordance with embodiments of the present disclosure, the step of forwarding 4 the liquid sample from the at least one outlet of the preparation module into the at least one inlet of the routing module may also comprise monitoring (e.g., measuring) the pressure Pj (e.g. using a pressure gauge, at the inlet(s) of the routing module, for example by pressure gauge. For example, the pressure Pj may be measured in between the inlet junction 125 and the routing module 105.

In a method in accordance with embodiments of the present disclosure, the step of preparing 3 the liquid sample in microfluidic flow comprising the objects of interest may comprise a plurality, for example a sequence, of different preparation steps. Furthermore, the flow speed through the preparation module may be non-uniform over time, or may even stop occasionally, for example due to flow-stops between the different preparation steps. In such situations, or in other use-cases where the flow rate Qs is substantially non-constant over time or experiences pauses from time to time, it may be particularly difficult to maintain a stable flow rate Qs. However, by controlling the auxiliary flow a stable flow rate or through the routing module can be maintained.

At least one flow control element may be controlled 7, taking the sensed flow characteristic into account to compensate for a variation in the flow rate of the prepared liquid sample in microfluidic flow. This controlling 7 may comprise adjusting a pressure Pa at which the auxiliary flow is injected 8 into the microfluidic flow in between the at least one outlet of the preparation module and the at least one inlet of the routing module. For example, in each time step n, a new pressure Pan may be applied.

For example, in a closed-loop control algorithm, the pressure Pa may be controlled. For example, the pressures Pa and Ps may be controlled. The pressures Ps, Pa and Pr may both have an influence on the flow rates Qs, Qa and Qr.

The pressure Pan-pi may differ from a pressure applied in a previous time step Pan by a difference $\Delta Pa = Pa_{n+1} - Pa_n$. For example, this difference $\Delta Pa$ may be determined by calculating a value dependent on the difference between the measured flow characteristic and a predetermined target value of the flow characteristic, for example a difference between the measured flow rate Qr and a setpoint Qr*. For example, a difference of the flow rate Qrn measured in a time step n and the setpoint Qr* may be used as argument for a function Fa to calculate the pressure difference $\Delta Pa$. The function Fa may be a linear scaling function, for example the difference Qr-Qr* may be multiplied by a predetermined scaling factor. The function Fa may also be a non-linear function, for example a monotonously increasing, or an increasing, function. The function Fa may be unbiased, for example may map a zero argument onto a zero function value. The function Fa may be antisymmetric, for example such that Fa(-x)=-Fa(x).

Additionally, the pressure Ps at which the liquid sample is injected into the preparation module may also be controlled 7.

The pressure $Ps_{n+1}$ may differ from a pressure applied in a previous time step Psn by a difference $\Delta Ps = Ps_{n+1} - Ps_n$. For example, this difference $\Delta Ps$ may be determined by calculating a value dependent on the difference between the measured flow characteristic and a predetermined target value of the flow characteristic, for example a difference between the measured flow rate Qr and a setpoint Qr*. For example, a difference of the flow rate Qrn measured in a time step n and the setpoint Qr* may be used as argument for a function Fs to calculate the pressure difference $\Delta Ps$. The function Fs may be a linear scaling function, for example the difference Qr-Qr* may be multiplied by a predetermined scaling factor. The function Fs may also be a non-linear function, for example a monotonously increasing, or an increasing function. The function Fs may be unbiased, for example may map a zero argument onto a zero function value. The function Fs may be antisymmetric, for example such that Fs(-x)=-Fs(x).

For example, a closed-loop control algorithm, for example a PID algorithm, in accordance with embodiments of the present disclosure may take the following set of equations into account: Qr=Qs+Qa Qs=(Ps−Pj)/(Rs+Rc) Qa=(Pa−Pj)/Ra and Qr=(Pj−PO)/Rr, when no additional pressure source injects liquid into the router module at a pressure Pr, or Qr=(Pj−Pr)/Rr*, when an additional pressure Pr in the router module is taken into account. The resistance Rr* may depend on where the additional pressure acts on the microfluidic flow in the router module, for example refers to the flow resistance of the microfluidic flow path from the inlet(s) of the router module to the point where a secondary fluid is admixed to the sample fluid in microfluidic flow in router module at the pressure Pr.

In a second aspect, the present disclosure also relates to a microfluidic routing device 110, for example in the form of a cartridge, such as a disposable cartridge, for preparing a microfluidic flow of a fluid having objects of interest immersed therein and for routing the objects of interest in the microfluidic flow; for example for detecting, sorting, purifying and/or characterizing objects of interest in a liquid sample, i.e. entities of interest in a liquid sample. For example, the objects of interest may comprise biological entities of interest in a liquid sample, such as a body fluid sample. For example, the microfluidic device 110 may comprise an enclosure that encapsulates the components of the device referred to hereinbelow, such as to form a cartridge. The device 110 may be adapted for detection and purification of the objects of interest immersed in a microfluidic flow. For example, the device may be a device for biological cell sorting and/or biological cell routing in clinical applications.

The microfluidic routing device 110 comprises an integrated sample preparation module 120 and an integrated router module 105, for example a cell router module, for example for biological cell sorting. Particularly, the sample preparation module 120 and the router module 105 may be integrated in a single package, for example co-integrated on a single substrate.

The preparation module 120 is adapted for preparing a liquid sample in microfluidic flow comprising the objects of interest for processing, i.e. for the intended process of detecting, sorting, purifying and/or characterizing the objects of interest. The preparation module 120 comprises at least one microfluidic channel for transporting the liquid sample that connects at least one inlet of the preparation module to at least one outlet of the preparation module.

The preparation module and/or the routing module and/or the microfluidic connection is adapted for sensing a flow characteristic, for example by an internal or external sensor element, of the liquid sample in microfluidic flow such as to control at least one flow control element taking the sensed flow characteristic into account by a closed-loop flow control to compensate for a deviation of the sensed flow characteristic from a predetermined target value of the flow characteristic.

In use, a volumetric flow rate of the liquid sample in microfluidic flow may differ significantly between at least one outlet of the preparation module and at least one inlet of the preparation module, for example such that a large difference in flow characteristics may exist between at least one input flow and at least one output flow. For example, the (total) volumetric flow rate over the (or all) outlet(s), for example all outlets excepting those dedicated to waste disposal, of the preparation module may be substantially lower than the (total) volumetric flow rate over the (or all) inlet(s) of the preparation module. As already mentioned hereinabove, also the routing module may involve a large difference in scale between the flow received from the preparation module containing the entities of interest and the total flow through the routing module, for example including a secondary flow for diluting, carrying and/or directing the flow of the entities of interest.

The preparation module 120 may comprise a plurality of preparation stages, for example a sample enrichment stage, a mixing stage, a dilution stage, an agitation stage, a staining stage, a cell lysis stage and/or a cell dissociation stage.

The routing module 105 is adapted for diverting the objects of interest from the microfluidic flow of the prepared liquid sample. The routing module 105 may be adapted for facilitating a detector of a system in accordance with embodiments of the third aspect of the present disclosure to detect an object of interest in the microfluidic flow of the prepared liquid sample in the router module. For example, the routing module 105 may have a part that is substantially transparent to enable an optical detection through the routing module. The routing module 105 may comprise an actuating element for receiving a routing signal and for diverting a detected object of interest away from a main component of the microfluidic flow in response to the routing signal.

The preparation module, for example for biological cell enrichment, and the router module, for example for biological cell routing, are interconnected (e.g. by a microfluidic connection such as by one or more microfluidic channels) such as to forward the prepared liquid sample in microfluidic flow from the at least one outlet of the preparation module 120 into at least one inlet of the routing module 105. The microfluidic flow between the at least one outlet of the preparation module and the at least one inlet of the routing module may be coupled by this microfluidic connection such as to passively buffer against and/or, in operation, actively compensate for variations in a flow rate of the prepared liquid sample in microfluidic flow at the at least one outlet of the preparation module.

By integrating the preparation module and the routing module in a single integrated microfluidic router device, losses of (some of) the objects of interest in the liquid sample during transfer and/or manipulation between different stages, for example between a preparation stage and a routing stage, can be kept low or may even be substantially prevented.

Furthermore, an in-line operation, for example a pipeline operation, can provide a low total sorting time. In-flow enrichment and mixing in the preparation module may also reduce a number of on-cartridge valves, and thus may reduce the cost, and may avoid or reduce clogging.

The microfluidic connection, for example the at least one interconnecting microfluidic channel, may have a minimum cross-sectional dimension, for example a channel width, height and/or diameter, in the range of 1.1, for example 1.5, times the size of the object of interest of the target cell) to about 2 mm. Particularly, the preparation module and the router module may be interconnected without any intermediate reservoir, container or buffer that has a cross-sectional dimension, for example relative to the general sense of flow from the preparation module to the routing module, that is larger than or equal to 5 mm (e.g., larger than or equal to 2 mm or larger than or equal to 1 mm).

The microfluidic connection may comprise a flow resistor 115, between the preparation module and the routing module, for coupling the microfluidic flow between the at least one outlet of the preparation module and the at least one inlet of the routing module. The flow resistor 115 may have a flow resistance Rc. The flow resistor may be adapted for passively buffering against variations in the flow rate of the prepared liquid sample in microfluidic flow at the at least one outlet of the preparation module.

The preparation module 120 may have a flow resistance Rs, for example a flow resistance of Rs between the at least one inlet and the at least one outlet of the preparation module. Likewise, the routing module 105 may have a flow resistance Rr.

The flow resistance Rc of the flow resistor 115 may be at least equal to a predetermined value that corresponds to an expected variation and/or fluctuation of a flow resistance of the preparation module and/or of the routing module.

The resistance value Rc may be at least equal to, for example larger by a factor 2, 3, 5 or 10 than, the variations or fluctuations $\Delta Rs, \Delta Rr$ in the flow resistances of the preparation module and/or the routing module. Thus, relative (e.g., percental) flow rate fluctuations due to $\Delta Rs$ and/or $\Delta Rr$ may be maintained at an acceptable level due to a sufficiently large resistance value Rc.

For example, referring to an example embodiment as shown in FIG. 2, if Pr=0, Qr=Qs=Ps/(Rs+Rc+Rr). Then Rc may be chosen such that $(\Delta Rs+\Delta Rr)/(Rs+Rr+Rc)<m$, where m is a predetermined maximum flow rate fluctuation percentage. For example, Rc may be selected as Rc $>(\Delta Rs+\Delta Rr)/m-Rs-Rr$. A similar expression may be easily obtained to estimate a suitable resistance value Rc in embodiments where additional flow parameters are to be taken into account, for example Ps, Pa and/or Qa as schematically illustrated in FIG. 4.

The microfluidic routing device 110 may comprise an inlet junction 125 for the routing module 105, for injecting an auxiliary flow of a liquid into the microfluidic flow in between the at least one outlet of the preparation module and the at least one inlet of the routing module, for example such that the microfluidic flow of the prepared liquid sample carrying the objects of interest to be routed may be joined with the auxiliary flow before entering the routing module. For example, at the inlet junction 125, the microfluidic flow of the prepared liquid sample carrying the objects of interest to be routed may be joined with the auxiliary flow, in operation of the device.

In a third aspect, the present disclosure relates to a microfluidic router system 100, for example a cell router system. Referring to FIG. 8, the microfluidic router system 100 comprises a microfluidic device 110 in accordance with embodiments of the second aspect of the present disclosure. The microfluidic router system also comprises an instrumentation device 160. The microfluidic routing device 110 can be mounted in the instrumentation device 160 for analysis or processing of a sample. The microfluidic routing device 110 may be disposable, for example may be a single-use cartridge. The microfluidic routing device may comprise functional components for physically handling the sample, for example sample and/or reagent tanks, cell preparation components, cell routing elements and/or post-sorting processing components. The instrumentation device 160 may comprise all peripheral hardware and/or software to facilitate the operation of the microfluidic routing device, for example for system level control and to provide a user interface, for actuation and control of the fluidics in the routing device, for optical detection of a light source and signal processing for fluorescence detection and/or cell imaging, for control and driving of the in-cartridge electrical components of the routing device, and/or for post-sorting cell dispensing (e.g. to transfer sorted cells to vials or onto glass slides in a sorted cell suspension). Particularly, the hardware of the instrument may be designed to avoid physical contact with the sample, for example to improve sample processing accuracy with minimal possibility of sample contamination.

The system may comprise a detector for detecting an object of interest in the microfluidic flow of the prepared liquid sample in the router module.

The detector may comprise an optical detector, for example for obtaining an optical detection signal, such as a fluorescence, a bright field, a dark field and/or a scatter signal and/or an image of the object (e.g. a microscopic image, a holographic image and/or a diffraction image).

The system may comprise a processor for determining at least one characteristic feature of the object of interest in the optical detection signal.

The processor may be adapted for calculating a routing signal in response to the detection of the at least one characteristic feature, and controlling an actuating element of the router module by the calculated routing signal to divert the detected object of interest away from a main component of the microfluidic flow.

The system may be adapted for calculating a routing signal in response to a detection of at least one characteristic feature, wherein the routing signal is adapted for controlling an actuating element at a suitable time (e.g., after a suitable delay for taking into account the movement of the object from the location of detection to a location where it is to be diverted from a main component of the microfluidic flow by way of the actuating element). Furthermore, the signal may be calculated to control the actuating element for a suitable duration, for example taking into account a flow speed, a size, a mass and/or a volume of the object of interest. Furthermore, the signal may be calculated to control the actuating element by a suitable intensity, for example a force exerted by the actuating element on the object of interest may depend on a signal strength of a control signal supplied to the actuating element.

The microfluidic router system may comprise a first fluid actuator, for example a fluid pump, for injecting the liquid sample into the preparation module 120 at a first pressure Ps.

The microfluidic router system may comprise a second fluid actuator, for example a fluid pump, for injecting a liquid into the microfluidic flow of the prepared liquid sample in the routing module 105 at a second pressure Pr.

The microfluidic router system may comprise a third fluid actuator, for example a fluid pump, for injecting an auxiliary flow of a liquid into the microfluidic flow in between the at least one outlet of the preparation module 120 and the at least one inlet of the routing module 105 at a third pressure Pa via the inlet junction 125).

The first, second, and/or third fluid actuator may form part of the microfluidic device 110, or may be partly embodied in the microfluidic device. For example, fluid handling parts of the fluid actuator(s) may be embodied in the microfluidic device, while actuating and/or powering parts of the fluid actuator(s) may be embodied in the microfluidic device 110 or the instrumentation device 160.

The microfluidic router system may comprise at least one pressure detector, for example a pressure gauge, for monitoring and/or measuring the first pressure Ps, the second pressure Pr and/or the third pressure Pa and/or a fourth pressure Pj at the inlet(s) of the routing module. For example, the fourth pressure Pj may be measured in between the inlet junction 125 and the routing module 105.

The microfluidic router system may comprise at least one sensor 95 for sensing a flow characteristic of the liquid sample in microfluidic flow in the preparation module 120 and/or in the routing module 105 and/or in the microfluidic connection in between the preparation module and the routing module 105.

The at least one sensor 95 may comprise a flow speed sensor, a fluid presence detector or a fluid optical parameter detector. For example, the flow characteristic may be which the presence of the liquid carrying the objects of interest is detected at the sensing location due to a change in light transmission, light reflection or similar optical properties. For example, the sensor may comprise a light barrier as illustrated in FIG. 6.

The at least one sensor may comprise at least one flow detector for monitoring and/or measuring a flow rate Qs indicative of the flow through the preparation module and/or a flow rate Qr indicative of the flow into or through the routing module and/or a flow rate Qa indicative of the auxiliary flow.

The at least one flow detector may comprise a flow meter, for example an acoustic flow sensor and/or a thermal flow sensor. Alternatively, the flow rate Qr may be estimated, by a processor of the system, from a detected speed and/or detection frequency of detected objects in flow in the routing module.

The instrumentation device 160 may comprise a controller for controlling the first pressure Ps, the second pressure Pr and/or the third pressure Pa.

Figure 9:
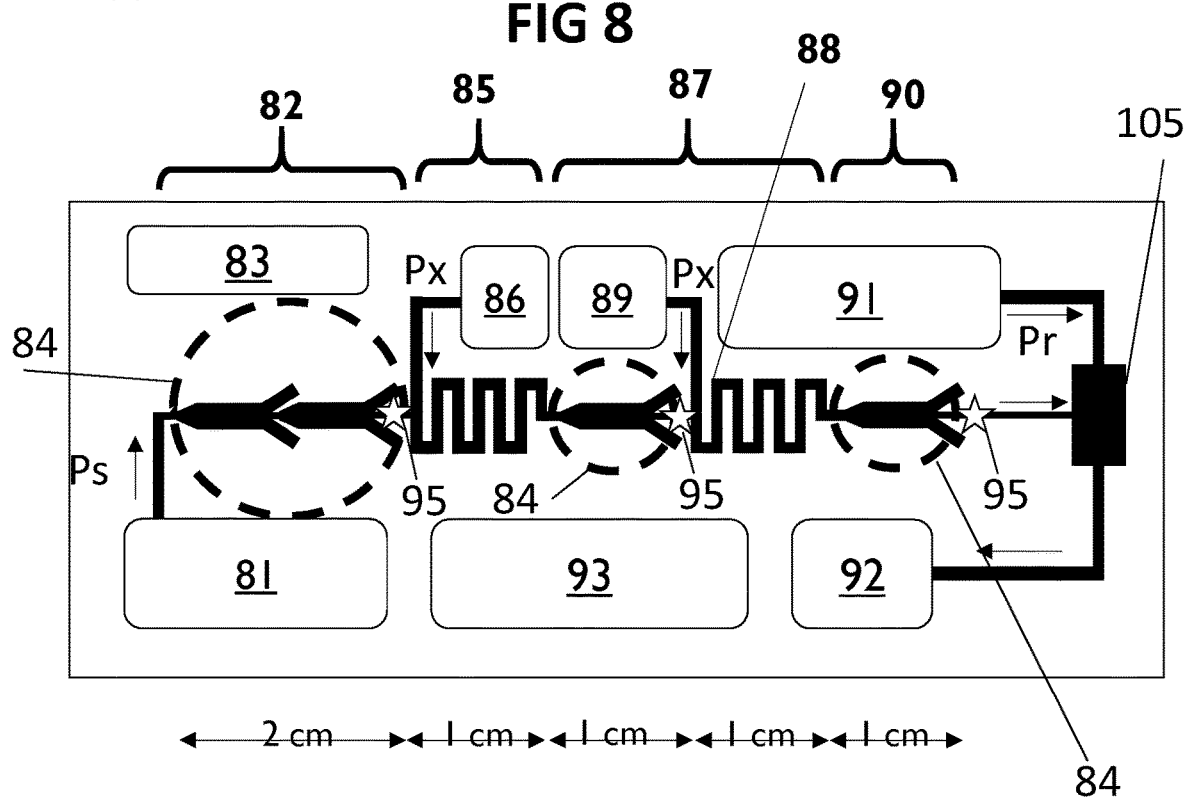
FIG. 9 illustrates an example microfluidic routing device in accordance with embodiments of the present disclosure.

The controller may also be adapted for controlling at least one further pressure Px, for example of a further fluid source in a stage forming part of the preparation module (e.g. such as schematically illustrated in the example of FIG. 9).

For example, the controller may be adapted for controlling at least one flow control element, (e.g., an actuation element such as a microfluidic valve or a microfluidic switch) to control the first, second, third and/or further pressure.

For example, the at least one flow control element may comprise a flow source (e.g., a secondary flow source). For example, the at least one flow control element may comprise a controllable fluid pump. For example, the at least one flow control element may comprise the first fluid actuator, the second fluid actuator, and/or the third fluid actuator, and/or a further fluid actuator.

The controller may be adapted for configured for and/or programmed for performing a closed-loop flow control to compensate for a deviation of the sensed flow characteristic from a predetermined target value of the flow characteristic.

Alternatively or additionally, the controller may be adapted for, configured for, and/or programmed for, activating the at least one flow control element in response to the sensed flow characteristic, for example such as to activate a stage or module (e.g. to activate a fluid source in that stage or module) when a moving liquid front is detected upstream of the that stage or module.

The controller may be adapted for adjusting the first pressure Ps by taking a deviation of the flow rate Qr indicative of the flow into or through the routing module from the predetermined target value into account.

For example, the controller may be adapted for controlling the second pressure Pr.

For example, the controller may be adapted for adjusting the third pressure Pa by taking the deviation of the flow rate Qr from the predetermined target value into account.

The system, for example the microfluidic routing device 110, may comprise at least one post-processing module 130, such as a post-sorting processing component, for manipulating the fluid sample or a selected fraction of the fluid sample.

For example, such post-processing may comprise a re-examination unit 140 for re-examining the selected fraction (e.g. the sorted objects). The re-examination unit may be adapted for imaging, or facilitating imaging, of the objects. The re-examination unit may be adapted for rerouting objects. The post-processing module may comprise a dispenser unit 150 for dispensing objects (e.g. after being selected by the routing device) in a suitable output form.

FIG. 9 illustrates an example microfluidic routing device 110 in accordance with embodiments of the present disclosure. For example, such device may be implemented on a limited footprint area on a 10 cm×6 cm chip). It shall be understood by the person skilled in the art that the dimensions indicated on the drawing and provided in the present description are only examples and not intended to limit the disclosure in any way.

The liquid sample comprising the objects of interest may be provided via a reservoir or an inlet 81. For example, the device may be adapted for processing a 2 mL sample. The sample preparation module may comprise a plurality of stages.

In a first stage 82, the sample may be enriched. During this stage, a large fraction of the liquid may be separated out as waste 83 (e.g. up to about 2 mL). The enrichment may, for example, be performed by acoustic focusing. For example, a piezoelectric disc 84 may apply vibrational energy to the device 110 in the first stage 82. In a second stage 85, the objects of interest in the sample may be stained. For example, 50 µL dye (e.g. from a reservoir 86) may be added to the microfluidic flow. In a third stage 87, the sample fluid may be washed by an enrichment step such as using another piezoelectric disc for acoustic focusing) followed by a mixing step in which a 80µL buffer (e.g. from a reservoir 89) is admixed using a serpentine mixer 88. A fourth stage 90 may provide a final enrichment. For example, again acoustic focusing may be used to further enrich the sample fluid. The microfluidic flow obtained at an outlet of the fourth stage 90 may then be fed into an inlet of the routing module 105.

In this routing module, another buffer fluid, for example 3 mL buffer from a reservoir 91, may be admixed to the sample fluid. The output of the routing module 105 may, for example, provide the objects of interest routed out of the sample for example collected in a reservoir 92 (e.g. in a 0.5 mL collection container) and the waste product of the routing stage (e.g. in a 3 mL waste reservoir 93).

Figure 10:
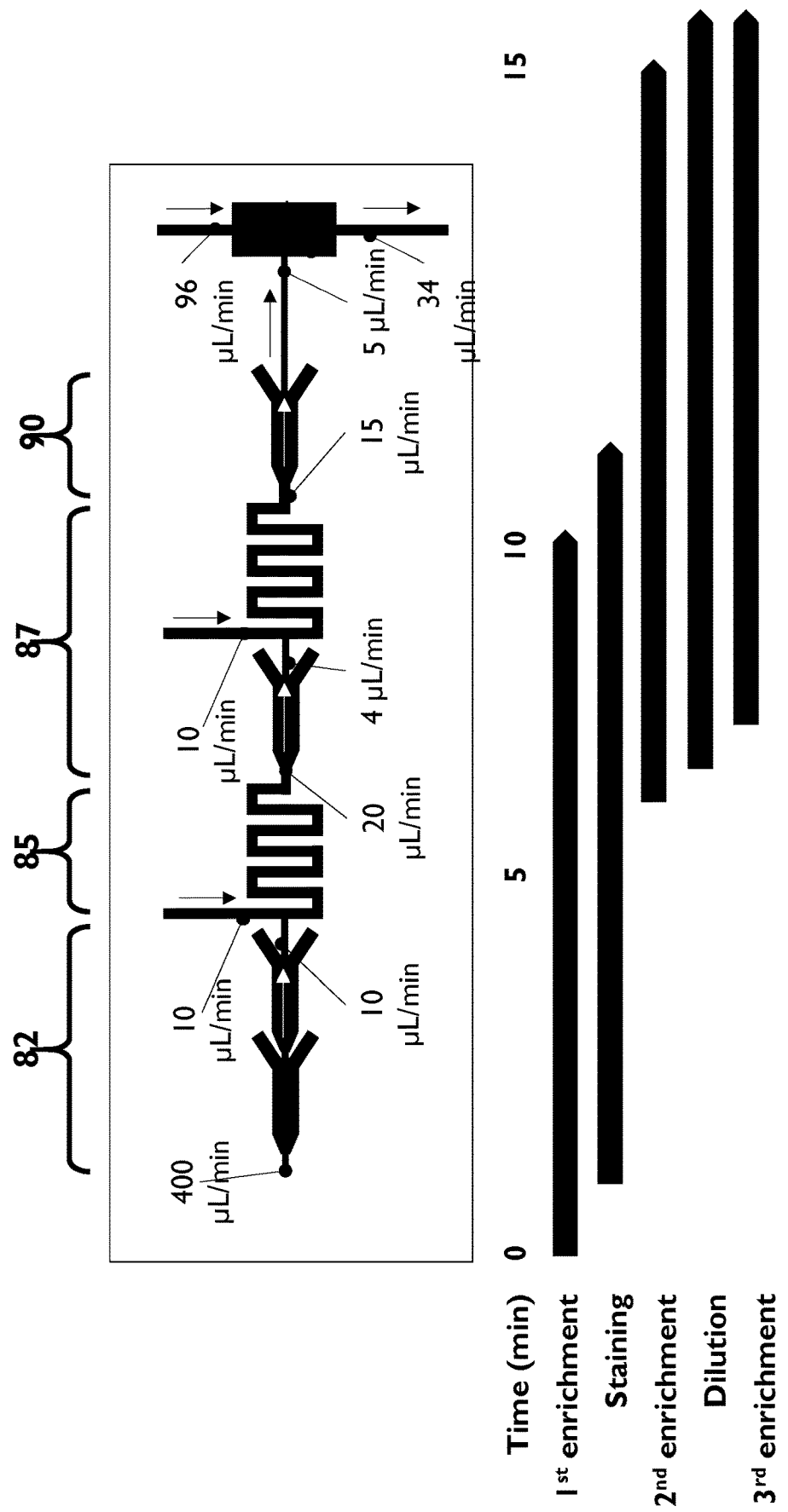
FIG. 10 shows flow rates and a timing diagram of an example device in accordance with embodiments of the present disclosure.

Example flow rates throughout this device are illustrated in FIG. 10. FIG. 10 also shows a timing diagram to illustrate the overall dwell times for passing the entire sample to be processed through each stage. The values indicated in the drawing are only exemplary, and not intended to limit the present disclosure in any way.

The invention claimed is:

1. A method for detecting, sorting, purifying, or characterizing objects of interest in a liquid sample, the method comprising:
    preparing, in a preparation module of a microfluidic router system, the liquid sample in microfluidic flow comprising the objects of interest for processing, wherein the preparing comprises transporting the liquid sample through at least one microfluidic channel from at least one inlet of the preparation module to at least one outlet of the preparation module;
    forwarding the prepared liquid sample in microfluidic flow from the at least one outlet of the preparation module into at least one inlet of a routing module of the microfluidic router system, the forwarding comprising coupling a microfluidic flow between the at least one outlet of the preparation module and the at least one inlet of the routing module;
    passively buffering against or actively compensating for variations in a flow rate of the prepared liquid sample in microfluidic flow at the at least one outlet of the preparation module; and
    diverting, in the routing module of the microfluidic router system, the objects of interest from the microfluidic flow of the prepared liquid sample, wherein the forwarding of the liquid sample comprises sensing a flow characteristic of the liquid sample in microfluidic flow in the preparation module or in the routing module or in a flow connection in between the preparation module and the routing module, and controlling at least one flow control element taking a sensed flow characteristic into account to compensate for a variation in the flow rate of the prepared liquid sample in microfluidic flow, wherein the controlling comprises a closed-loop flow control to compensate for a deviation of the sensed flow characteristic from a predetermined target value of the flow characteristic.

2. The method of claim 1, wherein sensing the flow characteristic comprises measuring, in the routing module, the flow rate of the prepared liquid sample in microfluidic flow.

3. The method of claim 2, comprising injecting the liquid sample or a further liquid into the preparation module at a first pressure, and wherein the controlling comprises adjusting the first pressure by taking the deviation of the flow rate from the predetermined target value into account.

4. The method of claim 1, wherein the controlling comprises activating the at least one flow control element in response to the sensed flow characteristic to activate a fluid source in a stage or module of the microfluidic router system.

5. The method of claim 1, in which the diverting of the objects of interest comprises injecting a further liquid into the microfluidic flow of the prepared liquid sample in the routing module at a second pressure, and wherein the controlling comprises controlling the second pressure.

6. The method of claim 1, wherein the forwarding of the liquid sample comprises injecting an auxiliary flow of a yet further liquid into the microfluidic flow in between the at least one outlet of the preparation module and the at least one inlet of the routing module at a third pressure, and wherein the controlling comprises adjusting the third pressure by taking the deviation of the flow rate from the predetermined target value into account.

7. The method of claim 1, wherein the forwarding of the liquid sample from the at least one outlet of the preparation module into the at least one inlet of the routing module comprises coupling the microfluidic flow between the at least one outlet of the preparation module and the at least one inlet of the routing module by a flow resistor having a flow resistance to passively resist against flow resistance variations of the preparation module or routing module, wherein the flow resistance of the flow resistor is at least equal to a predetermined value that corresponds to an expected variation or fluctuation of a flow resistance of the preparation module or of the routing module.

8. The method of claim 1, wherein the detecting comprises detecting at least one characteristic feature of the object of interest in an optical detection signal, and wherein the diverting of the objects of interest from the microfluidic flow comprises calculating a routing signal in response to the detection of the at least one characteristic feature and controlling an actuating element by the calculated routing signal to divert the detected object of interest away from a main component of the microfluidic flow.

9. A microfluidic routing device for preparing a microfluidic flow of a fluid having objects of interest immersed therein and for routing the objects of interest in the microfluidic flow, the device comprising:
  a sample preparation module adapted for preparing a liquid sample in microfluidic flow comprising the objects of interest for processing, the sample preparation module comprising at least one microfluidic channel, for transporting the liquid sample, that connects at least one inlet of the sample preparation module to at least one outlet of the sample preparation module;
  a routing module for diverting the objects of interest from the microfluidic flow of the prepared liquid sample; and
  a microfluidic connection for interconnecting the sample preparation module and the routing module, wherein interconnecting the sample preparation module and the routing module comprises forwarding the prepared liquid sample in microfluidic flow from the at least one outlet of the sample preparation module into an at least one inlet of the routing module;
  wherein the sample preparation module or the routing module or the microfluidic connection is adapted for sensing a flow characteristic of the liquid sample in microfluidic flow, and wherein the sample preparation module or the routing module or the microfluidic connection controls at least one flow control element taking the sensed flow characteristic into account by a closed-loop flow control to compensate for a deviation of the sensed flow characteristic from a predetermined target value of the flow characteristic.

10. The microfluidic routing device of claim 9, wherein the routing module comprises an actuating element for diverting a detected object of interest away from a main component of the microfluidic flow in response to a routing signal.

11. The microfluidic routing device of claim 9, wherein the microfluidic connection comprises a flow resistor having a flow resistance and being adapted for passively buffering against variations in a flow rate of the prepared liquid sample in microfluidic flow at the at least one outlet of the sample preparation module.

12. The microfluidic routing device of claim 9, comprising an inlet junction for the routing module, the inlet junction being adapted for injecting an auxiliary flow of a liquid into the microfluidic flow in between the at least one outlet of the sample preparation module and the at least one inlet of the routing module.

13. A microfluidic router system comprising the microfluidic routing device in accordance with claim 9 and an instrumentation device, wherein the microfluidic router system comprises at least one sensor for sensing the flow characteristic of the liquid sample in microfluidic flow in the sample preparation module or in the routing module or in the microfluidic connection, wherein the microfluidic router system comprises a first fluid actuator for injecting the liquid sample into the sample preparation module at a first pressure or a second fluid actuator for injecting a liquid into the microfluidic flow of the prepared liquid sample in the routing module at a second pressure or a third fluid actuator for injecting an auxiliary flow of a liquid into the microfluidic flow in between the at least one outlet of the sample preparation module and the at least one inlet of the routing module at a third pressure, wherein the instrumentation device comprises a controller for controlling at least one of the first pressure, the second pressure, or the third pressure, wherein the controller is adapted for performing a closed loop flow control to compensate for a deviation of the sensed flow characteristic from a predetermined target value of the flow characteristic.

14. The microfluidic router system of claim 13, wherein the controller is adapted for adjusting the first pressure or the third pressure by taking a deviation of a flow rate indicative of the flow into or through the routing module from the predetermined target value into account.

15. A diagnostic device comprising a microfluidic routing device in accordance with claim 9.

16. A diagnostic device comprising a microfluidic router system in accordance with claim 13.

* * * * *